Jan. 5, 1960 J. F. LASH 2,919,581
COMPONENT TRANSFORMATION NETWORK
Filed May 12, 1954 4 Sheets-Sheet 1

INVENTOR
Joseph F. Lash
BY
L. D. Burch
ATTORNEY

Jan. 5, 1960 J. F. LASH 2,919,581
COMPONENT TRANSFORMATION NETWORK
Filed May 12, 1954 4 Sheets-Sheet 2

INVENTOR
Joseph F. Lash
BY
L. D. Burch
ATTORNEY

INVENTOR
Joseph F. Lash

Jan. 5, 1960 J. F. LASH 2,919,581
COMPONENT TRANSFORMATION NETWORK
Filed May 12, 1954 4 Sheets-Sheet 4

Inventor
Joseph F. Lash
By
L. D. Burch
Attorney

United States Patent Office 2,919,581
Patented Jan. 5, 1960

2,919,581

COMPONENT TRANSFORMATION NETWORK

Joseph F. Lash, Ferndale, Mich., assignor to General Motors Corporation, Detroit, Mich., a corporation of Delaware Application May 12, 1954, Serial No. 429,159

14 Claims. (Cl. 73—462)

This invention relates to automatic balancing installations and, more particularly, to apparatus for compensating quadrature or conjugately resolved components of a total unbalance quantity to permit balance corrections to be made at points spaced other than 90 degrees apart.

The invention is specially suited for use in automatic balancing installations in which the total unbalance in a selected transaxial plane of correction of a dynamically unbalanced rotating body is vectorially resolved into two components and a balance correction performed therefor at two predetermined points spaced a fixed angular distance apart on the surface of the body. An automatic balancing installation of this character adapted to effect unbalance determinations and balance corrections in elongated rotating bodies such as crankshafts and the like is shown and described in United States Patent No. 2,783,649, issued March 5, 1957, and assigned to the present assignee. In this apparatus a rough balance correction is performed at two quadrature related, transaxial coplanar points on the cheek of selected counterweights of an engine crankshaft.

It is sometimes desirable to perform such balance corrections at angles other than 90 degrees apart, as where it is desired to perform a subsequent finish or assembly balance of a crank-shaft after it has been installed in an engine in order to correct for any unbalance effects thereon due to other parts of the engine. In such event a small amount of rough unbalance, say about 5 oz.-inches, is intentionally left in the shaft in order to control within limits the approximate location of the finish assembly unbalance, which occurs at a variable angle relative to an axial reference plane of the shaft. Therefore, it is desirable that the points at which the rough balance correction is performed be spaced as widely apart as possible in order to provide a long unobstructed sector on the cheek of the crankshaft and to assure that the finish balance correction will fall somewhere between the rough balance correction points.

Accordingly, the present invention has for its general object to provide suitable apparatus for compensating quadrature resolved components of an unbalance quantity to permit balance corrections at angles different from 90 degrees or $\pi/2$ radians.

The manner in which the foregoing is accomplished will appear from the following detailed description and drawings in which.

Figure 1:
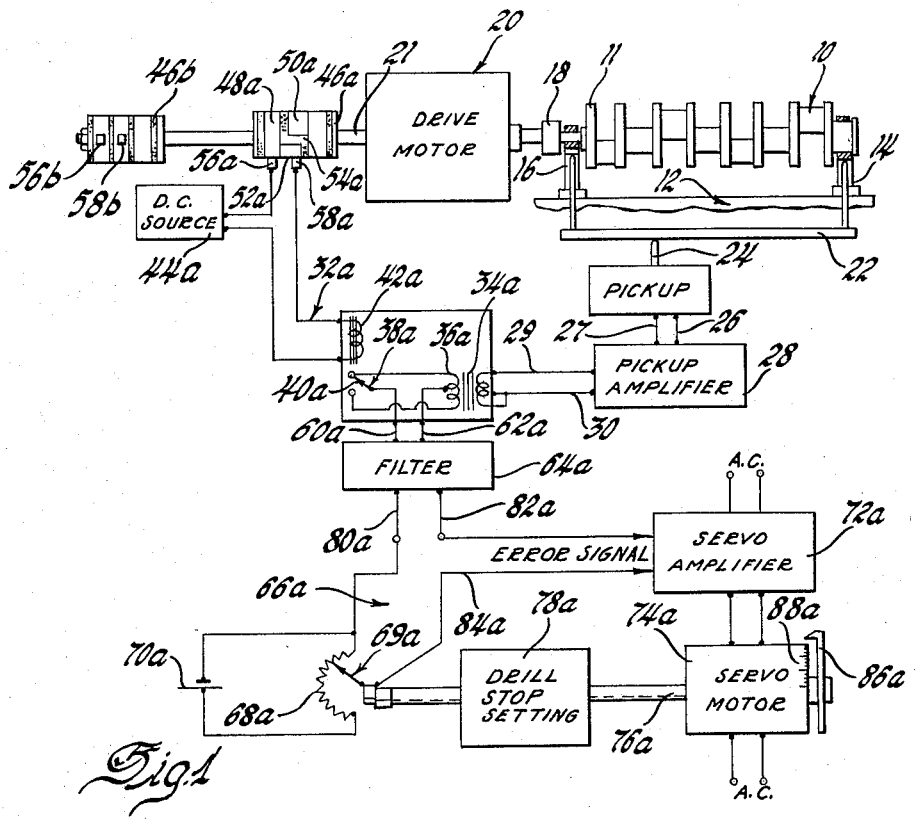
Fig. 1 is a schematic and block diagrammatic showing of a form of balancing apparatus in which the persent invention may be employed.

Referring to Fig. 1 of the drawings, the body to be balanced is show as a crank shaft 10 mounted in a fixture 12 which includes a pair of resilient or oscillatable supports 14, 16 that permit vibration of the ends of the shaft in an axial plane thereof. The shaft is coupled through a suitable coupling arrangement 18 to be driven by a constant speed drive motor 20. Coupled to the supported ends of the shaft is a mechanical nodal bar 22 having an electrical pickup 24 positioned at one of the mechanical nodes thereof.

No attempt has been made to show any particular construction of mounting supports and coupling for the shaft and the nodal bar, the drawings being for the most part of a diagrammatic nature to bring out principles of operation rather than particular details of construction. However, reference is made to U.S. Patent 2,293,371 in the name of T. C. Van Degrift assigned to the present assignee illustrating and describing a suitable mounting and nodal bar construction which can be adapted for use in the foregoing apparatus.

The electrical pickup 24 generates an alternating current signal representative of the total unbalance quantity in a selected correction plane through a counterweight 11 of the shaft. The pickup signal is applied over conductors 26, 27 and amplified in a suitable amplifier 28 from which it is applied over conductors 29, 30 to a commutation or equivalent integrating arrangement 32a. Following the amplifier 28, the numerical designation of the elements of the balancing installation herein illustrated will be accompanied by the lower case letters $a$ or $b$ whereby they may be identified with the particular unbalance component $a$ or $b$, as Fig. 2 for example, being determined thereby.

The commutation arrangement 32a may include an input transformer 34a having a center-tapped secondary winding 36a, a relay switching element 38a having a two-position switch arm 40a and an activating coil 42a energized from a D.C. source 44a through a mechanical commutator 46a comprising one or more continuous rings 48a and a pair of split rings 50a, 52a separated by an insulating segment 54a. The commutator 46a is coupled to rotor shaft 21 of the drive motor to be driven in synchronism with crankshaft 10 and has a pair of stationary brushes 56a, 58a associated with the continuous ring and the two split rings, respectively. The commutator 46a functions to interrupt the energization of the relay activating coil 42a for a 180 degree interval of the pickup signal so as to produce a commutated or interrupted wave the average value of which is proportional to the amplitude of the pickup signal and the angular location of the commutator brushes 56a, 58a relative to the axial plane containing the total unbalance. A suitable form of electronic integrating device that may be employed in place of the electro-mechanical commutation arrangement herein is illustrated in United States Patent No. 2,787,907, issued April 9, 1957, in the name of William F. King and assigned to the present assignee.

The output of the commutation arrangement is applied over conductors 60a, 62a, to a ripple smoothing filter 64a and then to a self balancing amplitude comparison circuit 66a comprising an adjustable potentiometer device 68a connected across a standard reference D.C. source 70a, a conventional servo amplifier 72a and a two phase servo motor 74a. The rotor shaft 76a of the servo motor 74a is coupled to the adjustable arm 69a of the potentiometer device and to an adjustable drill stop setting device 78a that may be electrically or mechanically associated wtih an adjacent or remotely located drilling organization (not shown) or equivalent apparatus with which the balance correction may be performed.

Figure 2:
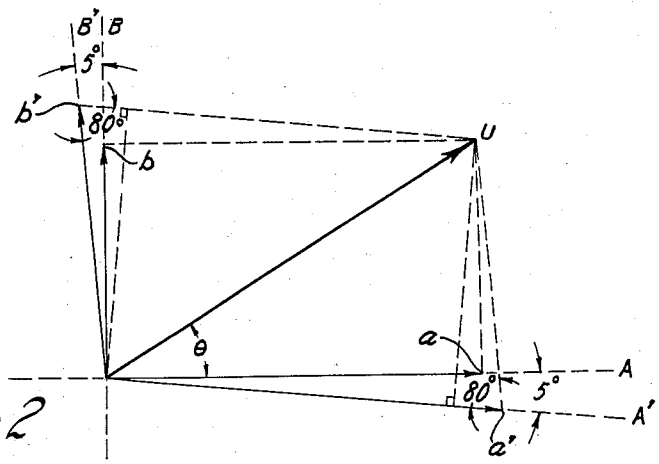
Figs. 2 and 7 are vector diagrams useful in understanding the principle of the present invention.

The filtered signal appearing between the conductors 80a, 82a represents the amplitude of the $a$ component of the total unbalance U of Fig. 2 and is compared in the amplitude comparison circuit 66a against that portion of the known potential of the standard reference source 70a appearing between conductor 80a and the potentiometer arm 69a of the potentiometer device. The net difference signal between these quantities is applied as an error signal over loop closing conductors 82a and 84a to the input of the servo amplifier 72a whose output is applied to the control phase winding of the two-phase servo motor to control the direction and extent of rotation thereof. The angular rotation of the servo motor 74a is proportional to the amplitude of the unbalance component and may be determined from a suitable pointer 86a mounted on the servo motor shaft 76a and a scale 88a calibrated in oz.-inches on the stator casing thereof.

Another commutator or equivalent device 46b having brushes 56b, 58b spaced 90 degrees relative to the brushes of commutator 46a is mounted on the shaft of the drive motor 20 for association with a commutation arrangement, filter and amplitude comparison circuit similar to that associated with commutator 46a and serves to provide an automatic determination of the other unbalance component b conjugately or orthogonally related to the unbalance component a. The above described arrangement for obtaining both of the unbalance components is shown somewhat more completely in the diagrammatic illustration of Fig. 4 in which the blocks labelled "component a" and "component b" in the branch circuits include the above described commutating arrangement and filter. Instead of employing separate reference sources for the balancing potentiometers 68a and 68b, a single reference source may be employed for both of the potentiometers, the high potential sides of which may be connected to the positive terminal of the reference source whose negative terminal is grounded.

Figure 4:
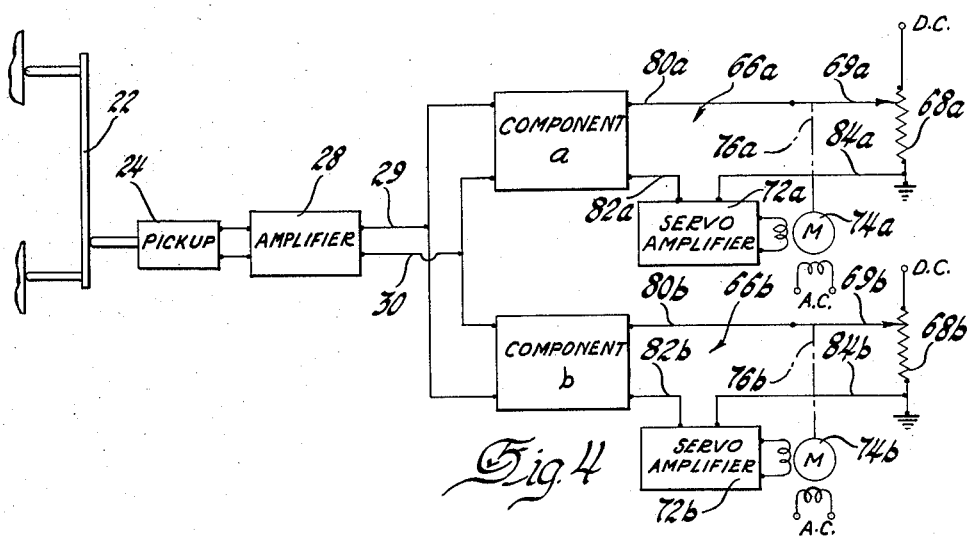
Fig. 4 is a part of apparatus of the type illustrated in Fig. 1.

In accordance with the present invention a compensating cross-correction network is added to the apparatus of Figs. 1 and 4 to permit the drilling of balance holes at included angles other than 90 degrees. Before proceeding with the description of the compensating network, the following analysis is given to illustrate the theory underlying the invention and is applied to a specific example where the included angle is 100 degrees.

The vector diagram of Fig. 2 shows an unbalance force U at an angle $\theta$ (theta) resolved into two sets of components $a$, $b$ and $a'$, $b'$ having included angles of 90 degrees and 100 degrees, respectively, therebetween. Mathematically these components may be represented by the following equations:

$$a = U \cos \theta \tag{1}$$

$$b = U \sin \theta \tag{2}$$

$$a' = U \left[ \cos(\theta+5) + \frac{\sin(\theta+5)}{\tan 80°} \right] \tag{3}$$

$$b' = U \left[ \cos(95-\theta) + \frac{\sin(95-\theta)}{\tan 80°} \right] \tag{4}$$

Assuming values of $\theta$ in 15 degree increments between 0 degree and 90 degrees, the following tabulation of figures contained in Table 1 are obtained:

Table 1

| $\theta$ | (a) Cos $\theta$ | (b) Sin $\theta$ | Cos $\theta$+5 | Sin $\theta$+5 | $\frac{\sin \theta+5}{\tan 80}$ | $a'$ | Cos 95−$\theta$ | Sin 95−$\theta$ | $\frac{\sin 95-\theta}{\tan 80}$ | $b'$ |
|---|---|---|---|---|---|---|---|---|---|---|
| 0 | 1.0000 | 0.0000 | 0.9962 | 0.0872 | 0.0154 | 1.0116 | −0.0872 | 0.9962 | 0.1757 | 0.0885 |
| 15 | 0.9659 | 0.2588 | 0.9397 | 0.3420 | 0.0603 | 1.0000 | 0.1736 | 0.9848 | 0.1737 | 0.3473 |
| 30 | 0.8660 | 0.5000 | 0.8192 | 0.5736 | 0.1011 | 0.9203 | 0.4226 | 0.9063 | 0.1598 | 0.5824 |
| 45 | 0.7071 | 0.7071 | 0.6428 | 0.7660 | 0.1351 | 0.7779 | 0.6428 | 0.7660 | 0.1351 | 0.7779 |
| 60 | 0.5000 | 0.8660 | 0.4226 | 0.9063 | 0.1598 | 0.5824 | 0.8192 | 0.5736 | 0.1011 | 0.9203 |
| 75 | 0.2588 | 0.9659 | 0.1736 | 0.9848 | 0.1737 | 0.3473 | 0.9347 | 0.3420 | 0.0603 | 1.0000 |
| 90 | 0.0000 | 1.0000 | −0.0872 | 0.9962 | 0.1757 | 0.0885 | 0.9962 | 0.0872 | 0.0154 | 1.0116 |

Figure 3:
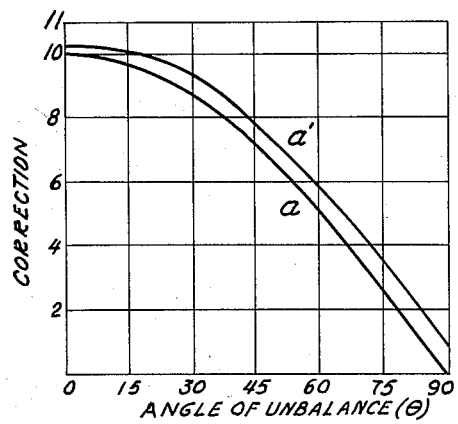
Figs. 3 and 6 are curves relating to the theory of the present invention.

Fig. 3 shows the $a$ and $a'$ components taken from Table 1 plotted as a function of the angle $\theta$ of the total unbalance force U. From these curves it may be noted that the required correction increment due to the wider angle is not constant, but varies with the angle $\theta$.

In the balancing circuit of the present invention, the potentiometers 68a and 68b are connected in a series circuit which includes the positive or high potential side of the reference source or cell 100, conductor 102, potentiometer 68a, grounded conductor 104, potentiometer 68b, and conductor 106 back to the negative or low potential side of 100. The compensating network 108 of the present invention is connected over conductors 112 and 110 to the arms 69a and 69b of potentiometers 68a and 68b, respectively, and comprises a pair of parallel circuit branches each composed of a pair of serially connected resistances 114a, 116a and 114b, 116b, respectively. Conductor 180a of the component a network is connected to one of the input terminals of the servo amplifier 72a the other input terminal of which is connected over conductor 181a to the junction point x of the left hand branch of the compensating network 108, and conductor 182a is connected to grounded conductor 104. The component a network is thus contained in a series circuit which includes conductor 180a connected in series with the input terminals of servo amplifier 72a, resistor 116a, conductor 112, that portion of potentiometer 68a between arm 69a and conductor 104, and conductor 182a. The component b network is similarly connected, the conductors 180b and 182b thereof being contained in a series circuit which includes the input of the servo amplifier 72b, conductor 181b connected to junction point y of the right hand branch of the compensating network 108, resistor 116b, conductor 110, that portion of potentiometer 68b between arm 69b and conductor 104 connected to conductor 182b. The servo motors 74a and 74b have their individual rotors mechanically coupled to the potentiometer arms 69a and 69b, respectively, and have their control windings connected to the output terminals of their respectively individual servo amplifiers. The reference or other phase winding of each motor is connected to a source of alternating current.

The compensating network 108 functions to inject in one or the other of the component networks a compensating voltage ($ka'$ or $kb'$) which is related to the balancing voltage $a'$ or $b'$ appearing between the adjustable arm and ground of the potentiometer 68a or 68b and which—when algebraically added to the quadrature component voltage $a$ or $b$ obtained from the branched output of the quadrature component resolving apparatus—will modify the output signal therefrom to correspond in magnitude to the required component for included angles different from 90 degrees. Rotation of either servo motor will change the voltage appearing across the conductors 110, 112 of the parallel branched compensating network and will cause a corresponding change in the compensating voltages including the compensating voltage applied to the component network opposite the network that is associated with the servo motor which is causing the change in the compensating network voltages.

Figure 5:
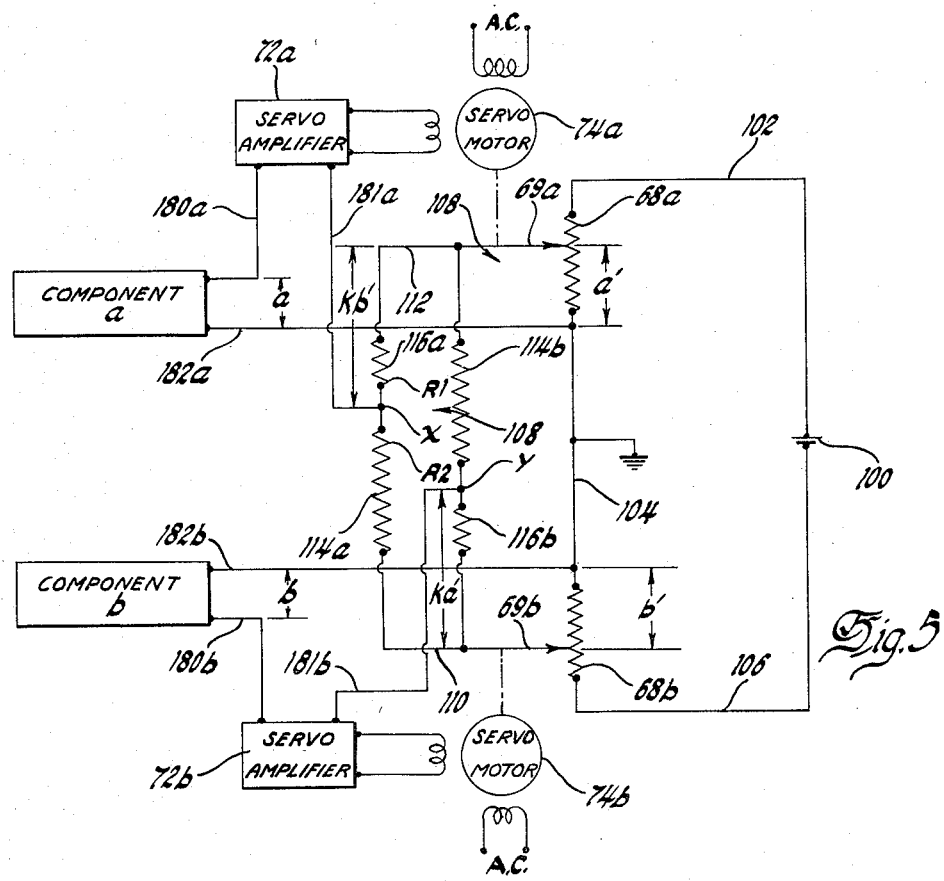
Fig. 5 is a modification of the apparatus of Figs. 1 and 4 in accordance with the present invention.

The circuit of Fig. 5 would be useful in adding the extra drill depth required for balancing at 100 degrees provided that the required increase in magnitude of one balancing force due to the drilling angle change were proportional to the required balancing force at 100 degrees of the other component, or, stated mathematically, provided that the following relations should apply:

$$a' = a + kb' \quad (5)$$
$$b' = b + ka' \quad (6)$$

Figure 6:
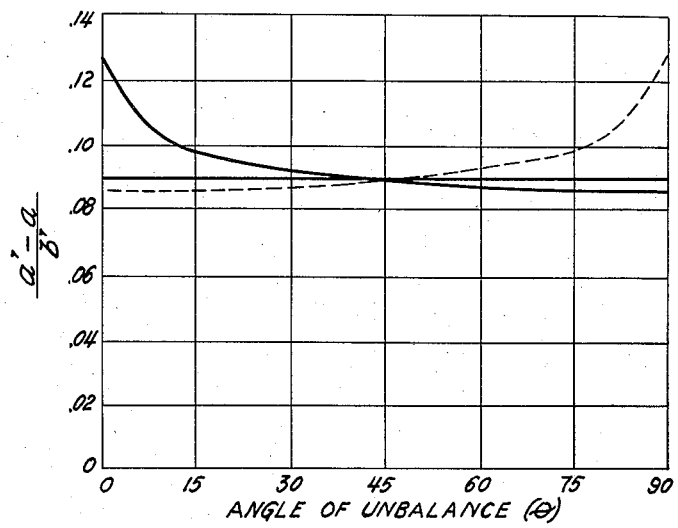

To check this, the ratios $$\frac{a'-a}{b'}$$

and $$\frac{b'-b}{a'}$$

were computed from Table 1, since these values would be indicative of the relationship between the change in balancing force magnitude with the change in drilling angle and the total correction required for the respective components. These ratios are tabulated in Table 2 below, and a plot of the ratio $$\frac{a'-a}{b'}$$

is shown in Fig. 6.

Table 2

| Angle | $a'-a$ | $b'-b$ | $\frac{a'-a}{b'}$ | $\frac{b'-b}{a'}$ |
|---|---|---|---|---|
| 0 | 0.0116 | 0.0885 | 0.1311 | 0.0875 |
| 15 | 0.0341 | 0 0885 | 0.0982 | 0.0885 |
| 30 | 0.0543 | 0.0824 | 0.0932 | 0.0895 |
| 45 | 0.0708 | 0.0708 | 0.0910 | 0.0910 |
| 60 | 0.0824 | 0 0543 | 0.0895 | 0.0932 |
| 75 | 0.0885 | 0.0341 | 0 0885 | 0 0982 |
| 90 | 0.0885 | 0.0116 | 0.0875 | 0.1311 |

From this table a value of 0.09 was chosen as an average value of the above ratios representing the factor $k$ of Equations 5 and 6.

The following analysis is given to verify that the foregoing relations are obtained with the circuit of Fig. 5 and shows how the component voltages $a'$ and $b'$ are obtained from the quadrative related unbalance voltages $a$ and $b$ appearing at the outputs of the component $a$ network and component $b$ network. Considering only one of the component networks and generalizing resistances 116a and 114a as $R_1$ and $R_2$ respectively, the application of Kirchoff's laws around the closed loop including signal voltage component $a$ appearing in the output of component $a$ block, the voltage drop across resistor $R_1$ and the balancing voltage $a'$ appearing between the potentiometer arm 69a of potentiometer 68a and conductor 182a, the summation of voltages around this closed loop must be equal to zero. The voltage drop across resistor $R_1$ is equal to $$\frac{R_1}{R_1+R_2}(a'+b')$$

assuming that no current is flowing into the compensating network from the component $a$ circuit, which relationship is true when the individual component circuits have been balanced. The following relations thus apply:

$$a = a' - \frac{R_1}{R_1+R_2}(a'+b') \quad (7)$$

$$a = a' - \frac{R_1}{R_1+R_2}(a') - \frac{R_1}{R_1+R_2}(b') \quad (7a)$$

$$a = \frac{R_2}{R_1+R_2}(a') - \frac{R_1}{R_1+R_2}(b') \quad (7b)$$

$$\frac{R_1+R_2}{R_2}a = a' - \frac{R_1}{R_2}b' \quad (7c)$$

$$(1+k)a = a' - kb' \quad (7d)$$

where $$k = \frac{R_1}{R_2} \quad (7e)$$

It will be noted that Equation 7d is substantially identical with Equation 5 except for the scale factor $(1+k)$ by which the quadrature signal component $a$ is multiplied. This factor is taken into account in the system by adjusting the reference voltage 100 or the gain of the pickup amplifier 28 when calibrating the system with a known amount of unbalance placed on a rotor mounted in the apparatus of Fig. 1. Thus, by proportioning the resistors $R_1$ and $R_2$ representing the factor $k$ of Equation 7d such that $R_2$ is eleven times as great as $R_1$, their ratio (1/11) will equal the selected average value (0.09) of the factor $k$ of Table 2. The components $a'$ and $b'$ are represented in their proper proportions by the settings of the two potentiometers 68a and 68b. The circuit of Fig. 5 will inject a compensating voltage into one or the other component network equal to the desired percentage of the main balancing voltage ($a'$ or $b'$) of the other component network, and thus will correct or compensate the quadrature selected signal components $a$ and $b$ to yield a close approximation for a balance correction to be performed at the larger included angle of 100 degrees. With 500 ohm potentiometers, suitable values of $R_1$ and $R_2$ may be 2,250 ohms and 25,000 ohms respectively, which will be found to cause only slight loading of the potentiometers.

Figure 5A:
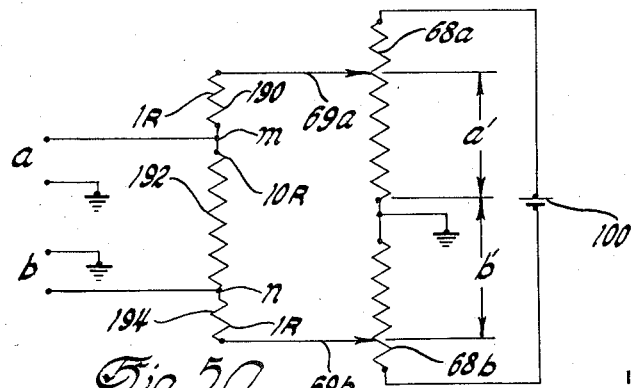
Fig. 5a is a modification of Fig. 5.

A modification of the compensating circuit of Fig. 5 is illustrated in Fig. 5a in which a single branch compensating network is employed between the arms 69a and 69b of the balancing potentiometers. The compensating network comprises an arrangement of three series connected resistors resistances 190, 192, and 194 apportioned in the ratio of 1R, 10R, 1R respectively, with the junctions $m$ and $n$ between each of the 1R resistances and the 10R resistances being connected to one terminal of the respective block component $a$ and component $b$ networks, the other terminal of each of which is grounded.

The error due to using a fixed value for the quantity $k$ to approximate $a'$ and $b'$ is shown in Table 3 below based on a 12 oz.-in. unbalance. The error in $a'$ would be $a' - (a + .09b')$, where $a'$ is taken from Table 1.

Table 3

| Angle | $a$ | .09 $b'$ | $a+.09\ b'$ | Error | X12 oz.-in. | Percent Error |
|---|---|---|---|---|---|---|
| 0 | 1.0000 | .00797 | 1.0080 | 0.0036 | −0.043 | −0.36 |
| 15 | 0.9659 | 0.03126 | 0.9972 | 0.0023 | −0.034 | −0.28 |
| 30 | 0.8660 | 0.0524 | 0.9184 | 0.0019 | −0.023 | −0.19 |
| 45 | 0.7071 | 0.0700 | 0.7771 | 0.0008 | −0.010 | −0.08 |
| 60 | 0.5000 | 0.0823 | 0.5823 | −0.0004 | +0.005 | +0.04 |
| 75 | 0.2588 | 0.0900 | 0.3488 | −0.0015 | +0.018 | +0.15 |
| 90 | 0.0000 | 0.0910 | 0.0910 | −0.0025 | +0.030 | +0.25 |

As shown in Table 3, the absolute and percentage error due to using a constant percent correction is of small enough magnitude to make the method usable.

Figure 7:
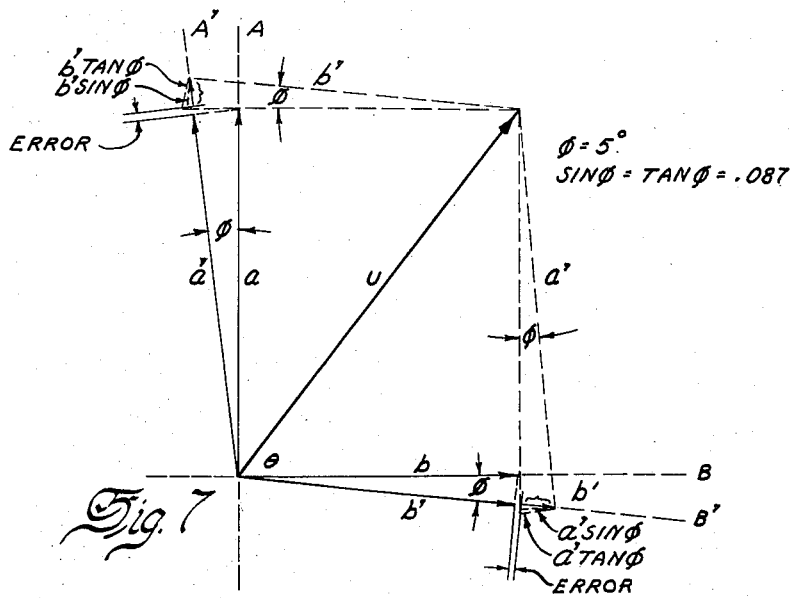

Another approach may be made to the problem by considering Fig. 7. Component $a$ is rotated counterclockwise to the A' axis, which is displaced by an angle $\phi$ (phi) of 5 degrees from the vertical or A axis. The vector ($b' \sin \phi$) corresponds to an addition of a percentage of vector $b'$ to vector $a$, which in the specific case discussed is 0.087 or 8.7% of the length of vector $b'$. This vector quantity plus vector $a$ falls short of equalling vector $a'$, the required correction by the slight error indicated on the drawing. It will be seen that the correction is always less than that required for exact balance. For this reason, an average value of 0.09 or 9% was chosen to reduce the error and make it both a plus and minus one. The same analysis may be performed on the B axis with corresponding results.

With the system of cross correction thus described, drilling balance holes at an angle of 100 degrees rather than 90 degrees will produce an error of less than 0.4% balance. In terms of a 12 ounce-inch correction this error would be less than 0.05 ounce-inch, which is well within the correction limit requirements of most industrial balancing applications.

While the invention has been described as applied to a specific included angle of 100 degrees, the method of analysis can be extended to and the compensating apparatus employed to perform balance corrections at other angles.

What is claimed is:

1. The combination with apparatus for analyzing an unbalance force of an unbalanced rotating body into two components and including vibration pickup means developing an electrical signal having characteristics related to said unbalance, component analyzing means resolving said unbalance force into two quadrature related components, said analyzing means being connected to said vibration pickup means and having a pair of branch circuits providing signal outputs corresponding in magnitude to said quadrature components, and adjustable potentiometric devices connected in each of said branch circuits, of means for modifying said quadrature related components to permit balance correction for said unbalance force at a pair of fixed points on said body having an included angle different from 90 degrees therebetween comprising a fixed compensating network having first and second interconnecting portions between said adjustable potentiometric devices and electrically cross-connected to inject a compensating signal in the branch output circuits of said component analyzing means, the compensating signal from said first portion being proportional to the voltage across one of said potentiometric devices and being variable as said one of said potentiometric devices is adjusted, and the compensating signal from said second portion being proportional to the voltage across the other of said potentiometric devices and being variable as said other of said potentiometric devices is adjusted.

2. The combination with apparatus for analyzing an unbalance force of an unbalanced rotating body into two components and including vibration pickup means developing an electrical signal having characteristics related to said unbalance, component analyzing means resolving said unbalance force into two quadrature related components, said analyzing means being connected to said vibration pickup means and having a pair of branch circuits providing signal outputs corresponding in magnitude to said quadrature components, and adjustable potentiometric devices connected in each of said branch circuits, of means for modifying said quadrature related components to permit balance correction for said unbalance force at a pair of fixed points on said body having an included angle different from 90 degrees therebetween comprising a fixed compensating network having a first portion interconnecting the potentiometric device in one of said branch circuits with the other of said branch circuits and a second portion interconnecting the potentiometric device in said other branch circuit with said one branch circuit to inject a compensating signal in each of said branch output circuits of said component analyzing means, the compensating signal from said first portion being proportional to the voltage across said one potentiometric device and being variable as said one potentiometric device is adjusted, and the compensating signal from said other potentiometric device being proportional to the voltage across said other potentiometric device and being variable as said other potentiometric device is adjusted.

3. The combination with apparatus for analyzing an unbalance force of an unbalanced rotating body into two components and including vibration pickup means developing an electrical signal having characteristics related to said unbalance, component analyzing means resolving said unbalance force into two quadrature related components, said analyzing means being connected to said vibration pickup means and having a pair of branch circuits providing signal outputs corresponding in magnitude to said quadrature components, and adjustable potentiometric devices connected in each of said branch circuits, of means for modifying said quadrature related components to permit balance correction for said unbalance force at a pair of fixed points on said body having an included angle different from 90 degrees therebetween comprising a fixed compensating network having a pair of circuit branches connected between said adjustable potentiometric devices, a portion of one of said compensating network circuit branches being connected in circuit with one of the said output circuit branches of said component analyzing means and a portion of the other of said compensating network circuit branches being connected in circuit with the other of said output circuit branches of said component analyzing means.

4. The combination with apparatus for analyzing an unbalance force of an unbalanced rotating body into two components and including vibration pickup means developing an electrical signal having characteristics related to said unbalance, component analyzing means resolving said unbalance force into two quadrature related components, said analyzing means being connected to said vibration pick-up means and having a pair of branch circuits providing signal outputs corresponding in magnitude to said quadrature components, and adjustable potentiometric devices connected in each of said branch circuits, of means for modifying said quadrature related components to permit balance correction for said unbalance force at a pair of fixed points on said body having an included angle different from 90 degrees therebetween comprising a fixed compensating network connected between said adjustable potentiometric devices and comprising a pair of parallel circuit branches each having a portion connected in circuit with a respective one of said output circuit branches of said component analyzing means and injecting a compensating signal in a circuit branch of said component analyzing means related to the signal potential appearing across the potentiometric device associated with the opposite branch circuit of said component analyzing means.

5. The combination with apparatus for analyzing an unbalance force of an unbalanced rotating body into two components and including vibration pickup means developing an electrical signal having characteristics related to said unbalance, component analyzing means resolving said unbalance force into two quadrature related components, said analyzing means being connected to said vibration pickup means and having a pair of branch circuits providing signal outputs corresponding in magnitude to said quadrature components, and adjustable potentiometric devices connected in each of said branch circuits, of means for modifying said quadrature related components to permit balance correction for said unbalance force at a pair of fixed points on said body having an included angle different from 90 degrees therebetween comprising a fixed compensating network connected between said adjustable potentiometric devices and comprising a single circuit branch having one portion thereof connected in circuit with one of said output circuit branches of said component analyzing means and another portion thereof connected in circuit with the other of said circuit branches of said component analyzing means.

6. In combination, a pair of amplitude comparison circuits each having a pair of input terminals, a source of potential, a pair of adjustable balancing potentiometers connected to said potential source, each of said potentiometers including a resistance and an adjustable arm cooperating therewith, one side of each potentiometer resistance being connected to one of the input terminals of a different one of said amplitude comparison circuits, a compensating network including tapped voltage dividing means connected between the adjustable arms of said potentiometers, said voltage dividing means having a tap thereon connected to the remaining input terminal of one of said amplitude comparison circuits and another tap connected to the remaining input terminal of the other of said amplitude comparison circuits.

7. The combination in accordance with claim 6 in which said compensating network includes a serially connected voltage divider connected between the adjustable arms of said potentiometers and having a pair of taps thereon each connected to the remaining input terminal of a different one of said amplitude comparison circuits.

8. The combination in accordance with claim 6 in which said compensating network includes a pair of tapped voltage dividers connected in a parallel circuit between the adjustable arms of said potentiometers and in which a tap of one of said voltage dividers is connected to the remaining input terminal of one of said amplitude comparison circuits and a tap on the other of said voltage dividers is connected to the remaining input terminal of the other of said amplitude comparison circuits.

9. In combination, a pair of amplitude comparison circuits each having a pair of input terminals, a pair of servo amplifiers each having a pair of input terminals and a pair of output terminals with one of the input terminals of each amplifier connected to one of the input terminals of said amplitude comparison circuit, a source of potential, a pair of adjustable balancing potentiometers connected to said potential source, each of said potentiometers including a resistance and an adjustable arm cooperating therewith, one side of each potentiometer resistance being connected to the remaining input terminal of a different one of said amplitude comparison circuits, a compensating network including tapped voltage dividing means connected between the adjustable arms of said potentiometers, said voltage dividing means having a tap thereon connected to the remaining input terminal of one of said servo amplifiers and another tap connected to the remaining input terminal of the other of said servo amplifiers, and a pair of servo motors each connected to the output terminals of a different one of said servo amplifiers and mechanically coupled to the adjustable arm of a different one of said potentiometers.

10. The combination in accordance with claim 9 in which said compensating network includes a serially connected voltage divider connected between the adjustable arms of said potentiometers and having a pair of taps thereon each connected to the remaining input terminal of a different one of said servo amplifiers.

11. The combination in accordance with claim 9 in which said compensating network includes a pair of tapped voltage dividers connected in a parallel circuit between the adjustable arms of said potentiometers and in which a tap of one of said voltage dividers is connected to the remaining input terminal of one of said servo amplifiers and a tap on the other of said voltage dividers is connected to the remaining input terminal of the other of said servo amplifiers.

12. The combination with apparatus for analyzing an unbalance force of an unbalanced rotating body into two components and including vibration pickup means developing an electrical signal having characteristics related to said unbalance and component analyzing means resolving said unbalance force into two quadrature related components, said analyzing means being connected to said vibration pickup means and having a pair of branch circuits providing signal outputs corresponding in magnitude to said quadrature related components, of means for modifying said quadrature related components, to permit balance correction for said unbalance at a pair of fixed points on said body having an included angle different from 90 degrees therebetween, said modifying means comprising a pair of amplitude comparison circuits each having a pair of input terminals, a pair of servo amplifiers each having a pair of input terminals and a pair of output terminals with one of the input terminals of each amplifier connected to one of the input terminals of said amplitude comparison circuit, a source of potential, a pair of adjustable balancing potentiometers connected to said potential source, each of said potentiometers including a resistance and an adjustable arm cooperating therewith, one side of each potentiometer resistance being connected to the remaining input terminal of a different one of said amplitude comparison circuits, a compensating network including tapped voltage dividing means connected between the adjustable arms of said potentiometers, said voltage dividing means having a tap thereon connected to the remaining input terminal of one of said servo amplifiers and another tap connected to the remaining input terminal of the other of said servo amplifiers, and a pair of servo motors each connected to the output terminals of a different one of said servo amplifiers and mechanically coupled to the adjustable arm of a different one of said potentiometers.

13. The combination in accordance with claim 12 in which said compensating network includes a serially connected voltage divider connected between the adjustable arms of said potentiometers and having a pair of taps thereon each connected to the remaining input terminal of a different one of said servo amplifiers.

14. The combination in accordance with claim 12 in which said compensating network includes a pair of tapped voltage dividers connected in a parallel circuit between the adjustable arms of said potentiometers and in which a tap of one of said voltage dividers is connected to the remaining input terminal of one of said servo amplifiers and a tap on the other of said voltage dividers is connected to the remaining input terminal of the other of said servo amplifiers.

References Cited in the file of this patent
UNITED STATES PATENTS

| | | |
|---|---|---|
| 2,108,624 | Thearle | Feb. 15, 1938 |
| 2,243,379 | Johnson | May 27, 1941 |
| 2,293,371 | Van Degrift | Aug. 18, 1942 |
| 2,363,373 | Werner | Nov. 21, 1944 |
| 2,500,013 | Svensson et al. | Mar. 7, 1950 |
| 2,636,381 | Hagg et al. | Apr. 28, 1953 |
| 2,783,649 | Hope | Mar. 5, 1957 |
| 2,787,907 | King | Apr. 9, 1957 |